(12) United States Patent
Borovinov

(10) Patent No.: US 9,531,184 B2
(45) Date of Patent: Dec. 27, 2016

(54) SYSTEMS AND METHODS FOR PROTECTING ELECTRICAL WIRE CONNECTIONS FROM OVERHEATING

(76) Inventor: Valentin Borovinov, Little Neck, NY (US)

( * ) Notice: Subject to any disclaimer, the term of this patent is extended or adjusted under 35 U.S.C. 154(b) by 510 days.

(21) Appl. No.: 13/352,231

(22) Filed: Jan. 17, 2012

(65) Prior Publication Data

US 2013/0180979 A1    Jul. 18, 2013

(51) Int. Cl.
    *H05B 1/02*    (2006.01)
    *H02H 5/04*    (2006.01)

(52) U.S. Cl.
    CPC .................... *H02H 5/043* (2013.01)

(58) Field of Classification Search
    CPC ......... H01R 4/62; H01R 12/00; H01R 31/065; H01R 13/5205; H01R 13/521; H01R 43/20; H01R 31/06; H01R 4/00; H05B 3/746; H05B 1/02; F27D 19/00; F27D 2019/0003; F27D 21/00; F27D 21/0014; G01K 13/00; G01K 2217/00; G01K 7/427; G01R 31/3606
    USPC .................. 219/110, 441, 448.11, 490–494, 412,219/413, 497, 499, 720, 723; 140/93.6, 30, 36, 140/39, 118, 149; 439/204, 607.15, 694, 697, 439/730, 749, 809, 878, 881, 888; 307/10.8, 307/117, 119, 651

See application file for complete search history.

(56) References Cited

U.S. PATENT DOCUMENTS

| | | | |
|---|---|---|---|
| 3,509,322 A * | 4/1970 | Lundin .......................... | 219/494 |
| 4,031,352 A * | 6/1977 | Oosterberg .................... | 219/212 |
| 4,214,151 A * | 7/1980 | Kicherer et al. ............... | 219/492 |
| 4,243,875 A * | 1/1981 | Chang ........................... | 219/497 |
| 4,283,634 A * | 8/1981 | Yannone et al. .............. | 290/40 R |
| 4,310,837 A | 1/1982 | Kornrumpf et al. | |
| 4,367,414 A * | 1/1983 | Miller et al. .................... | 307/38 |
| 4,391,237 A * | 7/1983 | Abe et al. ............... | 123/179.21 |
| 4,396,844 A * | 8/1983 | Miller et al. .................... | 307/39 |
| 4,484,258 A * | 11/1984 | Miller et al. ..................... | 700/12 |
| 4,485,296 A * | 11/1984 | Ueda et al. ................... | 219/505 |
| 4,489,385 A * | 12/1984 | Miller et al. .................. | 700/296 |
| 4,497,031 A * | 1/1985 | Froehling et al. ............ | 700/276 |
| 4,511,895 A * | 4/1985 | Miller et al. .................. | 370/462 |
| 4,535,332 A * | 8/1985 | Miller et al. ................. | 340/3.51 |
| 4,549,074 A * | 10/1985 | Matsuo ......................... | 219/505 |
| 4,555,930 A * | 12/1985 | Leach et al. ................... | 73/23.2 |
| 4,591,967 A * | 5/1986 | Mattes et al. ..................... | 700/3 |
| 4,598,286 A * | 7/1986 | Miller et al. ................. | 340/3.51 |
| 4,656,334 A * | 4/1987 | Endo et al. ................... | 219/212 |
| 4,656,475 A * | 4/1987 | Miller et al. ................. | 370/462 |
| 4,677,281 A * | 6/1987 | Mills ............................ | 219/505 |

(Continued)

*Primary Examiner* — Eric Stapleton
(74) *Attorney, Agent, or Firm* — Byrne Poh LLP

(57) ABSTRACT

Systems and methods for protecting electrical wire connections from overheating are provided. In some embodiments, methods for protecting electrical wire connections from overheating are provided, the methods comprising: detecting a signal responsive to a temperature of an electrical wire connection using a temperature sensor; comparing the signal to a threshold; and disconnecting power to a circuit when the comparison indicates that the temperature is over a given value. In some embodiments, systems for protecting electrical wire connections from overheating are provided, the systems comprising: a temperature sensor that detects a signal responsive to a temperature of an electrical wire connection using a temperature sensor; an operational amplifier that compares the signal to a threshold; and a relay that disconnects power to a circuit when the comparison indicates that the temperature is over a given value.

5 Claims, 15 Drawing Sheets

(56) References Cited

U.S. PATENT DOCUMENTS

| | | | | |
|---|---|---|---|---|
| 4,847,471 A * | 7/1989 | Wallgren et al. | | 219/497 |
| 5,023,430 A * | 6/1991 | Brekkestran et al. | | 219/486 |
| 5,032,705 A * | 7/1991 | Batcheller et al. | | 219/211 |
| 5,105,067 A * | 4/1992 | Brekkestran et al. | | 219/497 |
| 5,162,038 A * | 11/1992 | Wilker | | 600/22 |
| 5,270,520 A * | 12/1993 | Barzilai et al. | | 219/501 |
| 5,278,394 A * | 1/1994 | Morino | | 219/497 |
| 5,541,803 A * | 7/1996 | Pope et al. | | 361/103 |
| 5,590,010 A | 12/1996 | Ceola et al. | | |
| 5,616,265 A * | 4/1997 | Altman | | 219/497 |
| 5,705,792 A * | 1/1998 | Graham | | 219/497 |
| 5,788,789 A * | 8/1998 | Cooper | | 156/64 |
| 5,995,350 A | 11/1999 | Kopelman | | |
| 6,108,614 A * | 8/2000 | Lincoln et al. | | 702/183 |
| 6,114,668 A * | 9/2000 | Ogata et al. | | 219/494 |
| 6,697,757 B2 * | 2/2004 | Eckel et al. | | 702/130 |
| 6,777,021 B2 | 8/2004 | Huber et al. | | |
| RE38,714 E * | 3/2005 | Pope et al. | | 361/103 |
| 7,089,099 B2 * | 8/2006 | Shostak et al. | | 701/29.6 |
| 7,103,460 B1 * | 9/2006 | Breed | | 701/32.9 |
| 7,301,352 B1 * | 11/2007 | Sarma | | 324/691 |
| 7,385,743 B2 | 6/2008 | Gagliano et al. | | |
| 7,501,926 B2 | 3/2009 | Watchorn et al. | | |
| 7,506,390 B2 * | 3/2009 | Dixon et al. | | 5/713 |
| 7,795,877 B2 * | 9/2010 | Radtke et al. | | 324/530 |
| 7,804,280 B2 * | 9/2010 | Deaver et al. | | 323/210 |
| 7,808,760 B2 | 10/2010 | Kopelman | | |
| 8,031,003 B2 * | 10/2011 | Dishop | | 330/276 |
| 8,130,039 B2 * | 3/2012 | Dishop | | 330/276 |
| 8,547,036 B2 * | 10/2013 | Tran | | 315/291 |
| 2003/0065472 A1 * | 4/2003 | Eckel et al. | | 702/130 |
| 2004/0090195 A1 * | 5/2004 | Motsenbocker | | 318/109 |
| 2005/0192727 A1 * | 9/2005 | Shostak et al. | | 701/37 |
| 2006/0025897 A1 * | 2/2006 | Shostak et al. | | 701/1 |
| 2008/0010748 A1 * | 1/2008 | Menkedick et al. | | 5/600 |
| 2008/0106241 A1 * | 5/2008 | Deaver et al. | | 323/209 |
| 2008/0109387 A1 * | 5/2008 | Deaver et al. | | 705/412 |
| 2008/0122642 A1 * | 5/2008 | Radtke et al. | | 340/660 |
| 2008/0201847 A1 * | 8/2008 | Menkedick et al. | | 5/600 |
| 2008/0310850 A1 * | 12/2008 | Pederson et al. | | 398/135 |
| 2010/0295691 A1 | 11/2010 | King, Jr. | | |
| 2012/0086345 A1 * | 4/2012 | Tran | | 315/158 |

\* cited by examiner

SYSTEMS AND METHODS FOR PROTECTING ELECTRICAL WIRE CONNECTIONS FROM OVERHEATING

BACKGROUND

A major source of electrical fires is arcing and/or resistance in wiring connections. Arcing in a wiring connection can occur when electrical current flows through poor electrical connections, such as due to loose screws, loose twist-on wire connectors, bad crimps, damaged wire insulation, corrosion, etc. Resistance in a wiring connection can also be caused by poor electrical connections, such as due to loose screws, loose twist-on wire connectors, bad crimps, damaged wire insulation, corrosion, damage to a wire due to arcing, etc.

Arcing in connections and high current flowing through resistive connections can create large localized heat sources. Such heat sources can degrade insulation which can increase arcing and result in heat sufficient to start a fire.

SUMMARY

Systems and methods for protecting electrical wire connections from overheating are provided. In some embodiments, methods for protecting electrical wire connections from overheating are provided, the methods comprising: detecting a signal responsive to a temperature of an electrical wire connection using a temperature sensor; comparing the signal to a threshold; and disconnecting power to a circuit when the comparison indicates that the temperature is over a given value. In some embodiments, systems for protecting electrical wire connections from overheating are provided, the systems comprising: a temperature sensor that detects a signal responsive to a temperature of an electrical wire connection using a temperature sensor; an operational amplifier that compares the signal to a threshold; and a relay that disconnects power to a circuit when the comparison indicates that the temperature is over a given value.

DETAILED DESCRIPTION

Systems and methods for protecting electrical wire connections from overheating are provided. In some embodiments, mechanisms are provided for interrupting electrical power to an electric appliance (such as a light) in response to an increase in temperature.

More particularly, in some embodiments, these mechanisms can include an electrical interface between a power source (e.g., cables in a ceiling outlet junction box) and a lighting fixture that interrupts electrical power to the lighting fixture in the event that the temperature at one or more electrical connections reaches a given value. In some embodiments, such an interface can use one or more temperature sensors each embedded in a twist-on wire connector (or any other suitable type of electrical connector, such as a crimp connector, a lug connector, etc.) or in a wire for monitoring the temperature of one or more electrical connections.

Figure 1:
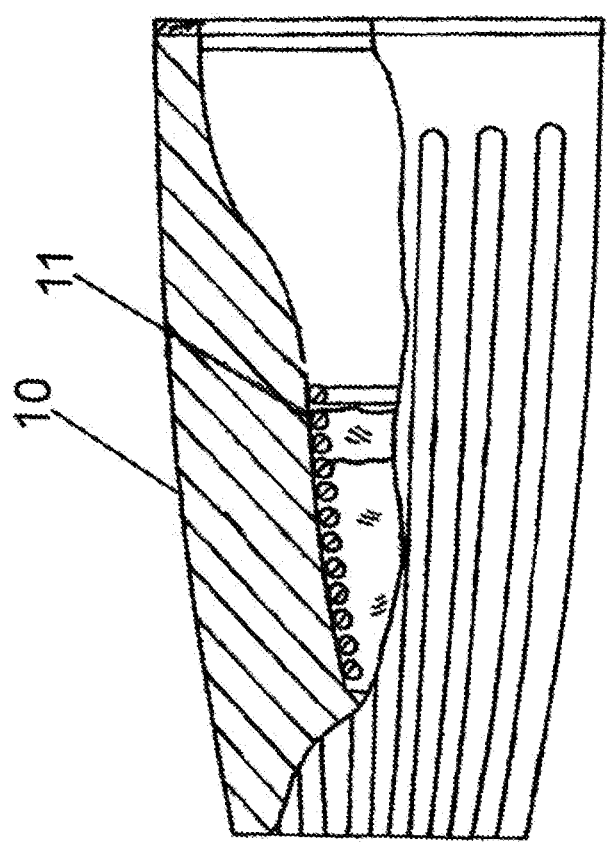
FIG. 1 is a drawing of an example of a twist-on wire connector in accordance with the prior art.

FIG. 1 is an illustration of an example of a typical twist-on wire connector used to join together two or more electrical wires as known in the art. When wires are joined in such a twist-on wire connector, the wire connector simultaneously forms an electrical wire junction and electrically insulates the wire junction from the wire's surroundings.

Typically, a twist-on electrical connector includes a dome shaped electrically insulating housing 10 (which can be made of plastic, for example) for grasping by a user and an internal member, such as spiral metal coil 11, for twistingly engaging bare ends of electrical wires to form an electrical connection therebetween as the bare ends of the wires are twisted into electrical engagement with each other through a twisting action on the wire connector with respect to the electrical wires.

Figure 2:
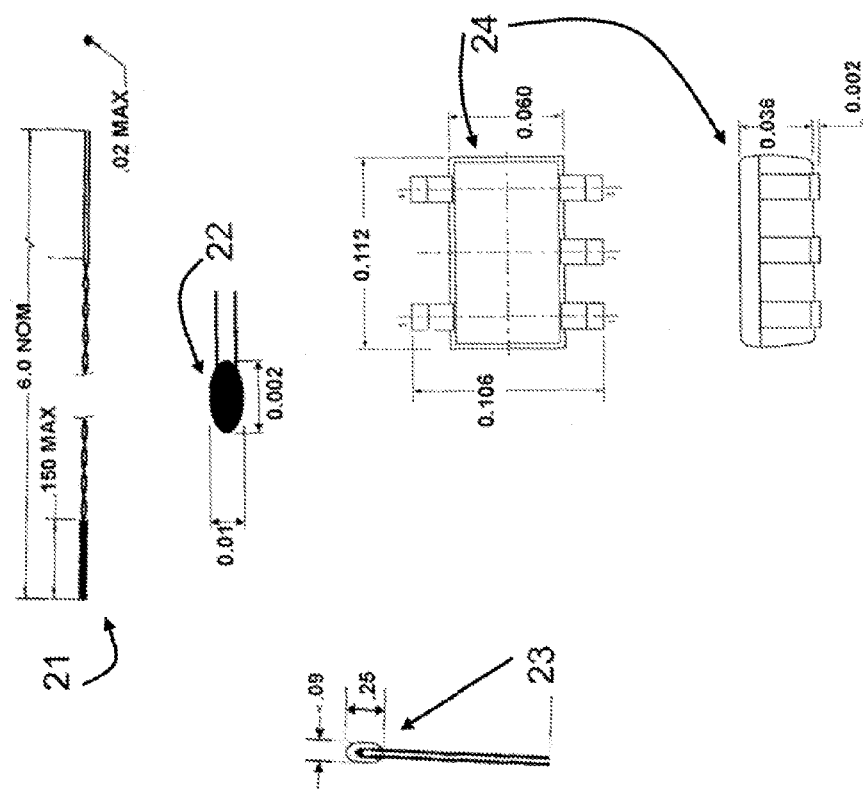
FIG. 2 shows examples of drawings of temperature sensors in accordance with the prior art.

Any suitable temperature sensors can be used in some embodiments. For example, various commercially available temperature sensors as shown in FIG. 2 may be suitable for embedding in a twist-on connector housing. For example, as illustrated, a miniature thermistor 21 made from QUALITY THERMISTOR, INC. of Boise, Id., a PICO BEAD, TYPE R THERMISTOR 22 from REDFISH SENSORS of Meridian, Id., a THERMISTOR GLASS PROBE RBGP-103M 23 from REDFISH SENSORS, a miniature microchip LM26NV 24 (which is a complete thermostat and can directly control an external transistor using only three wires: 5V, Ground and Vout) from NATIONAL SEMICONDUCTOR CORPORATION of Santa Clara, Calif., and/or any other suitable temperature sensor can be used in some embodiments.

Figure 3:
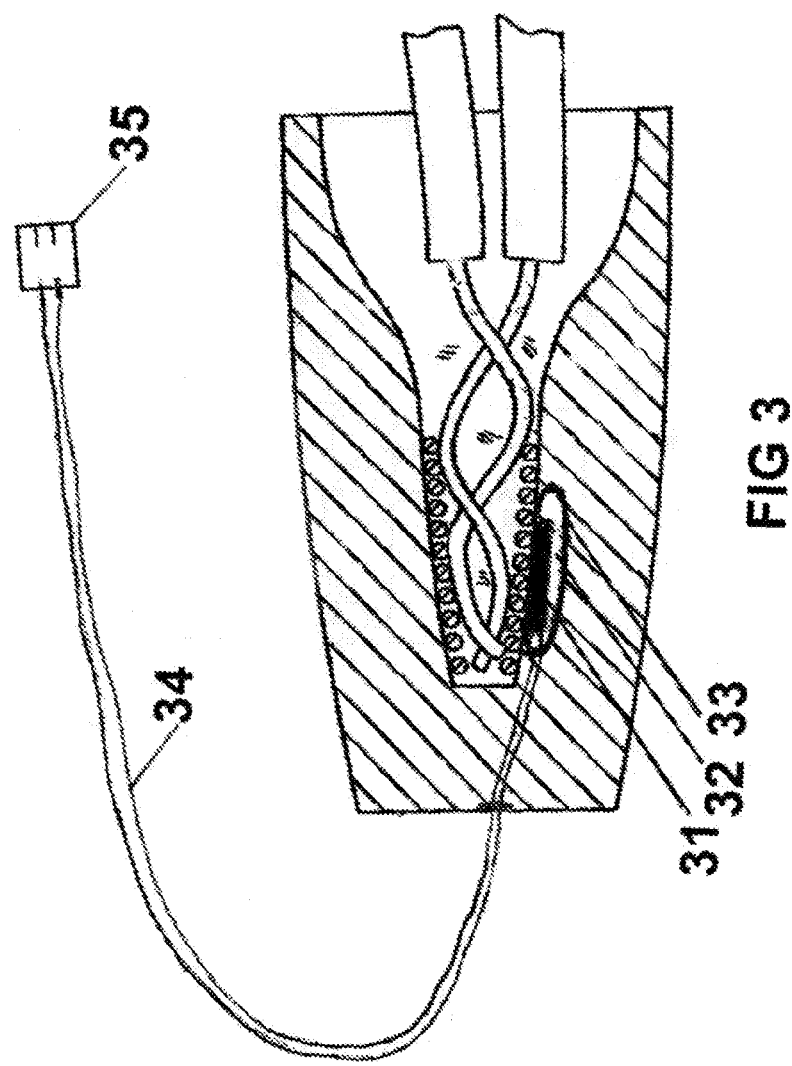
FIGS. 3-5 are cross-sectional views of twist-on wire connectors with temperature sensors embedded therein in accordance with some embodiments of the present invention.

FIG. 3 is a cross-sectional view of a twist-on wire connector with a temperature sensor 31 embedded on the side of the connector's spiral coil in a chamber 33 of the connector's housing in accordance with some embodiments. This chamber can also contain a silicone paste 32 to improve thermal conductivity between the housing, spiral coil, and/or wires and the temperature sensor in some embodiments. Insulated sensor leads 34 can exit the housing through the top and terminate in 2-pin connector 35 in some embodiments.

Figure 4:
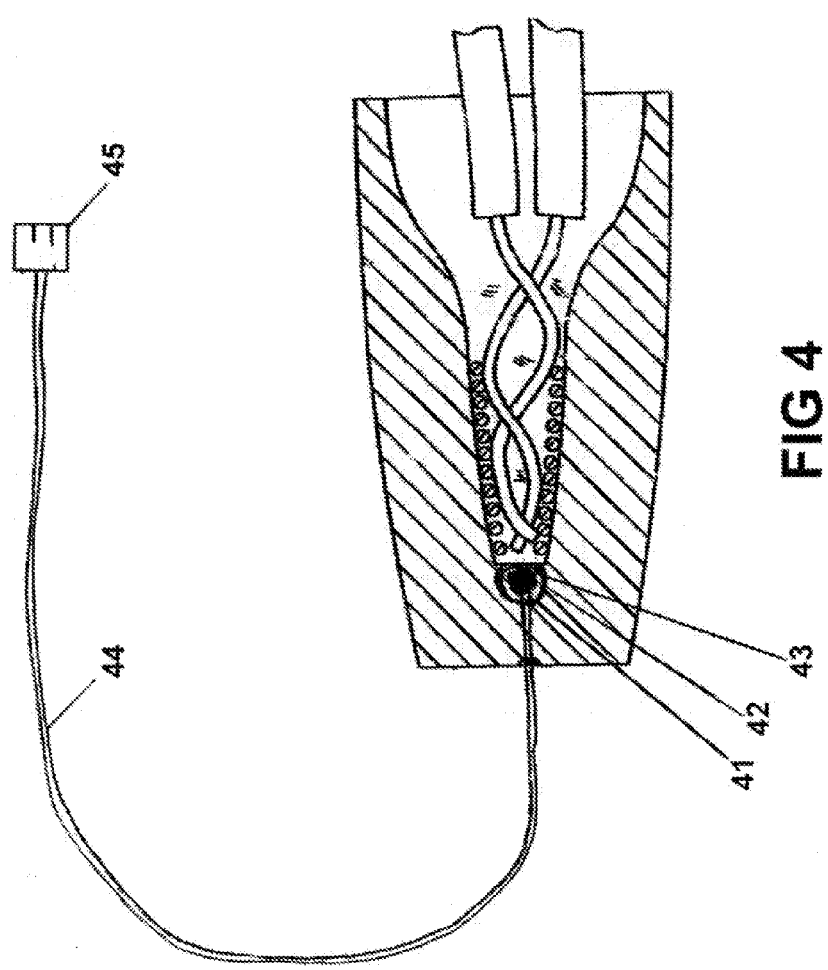

FIG. 4 is a cross sectional view of a twist-on wire connector with a temperature sensor 41 embedded at the tip of the spiral coil in a chamber 43 of the connector's housing in accordance with some embodiments. This chamber can also contain a silicone paste 42 to improve thermal conductivity between the housing, spiral coil, and/or wires and the temperature sensor in some embodiments. Insulated sensor leads 44 can exit the housing through the top and terminate in 2-pin connector 45 in some embodiments.

Figure 5:
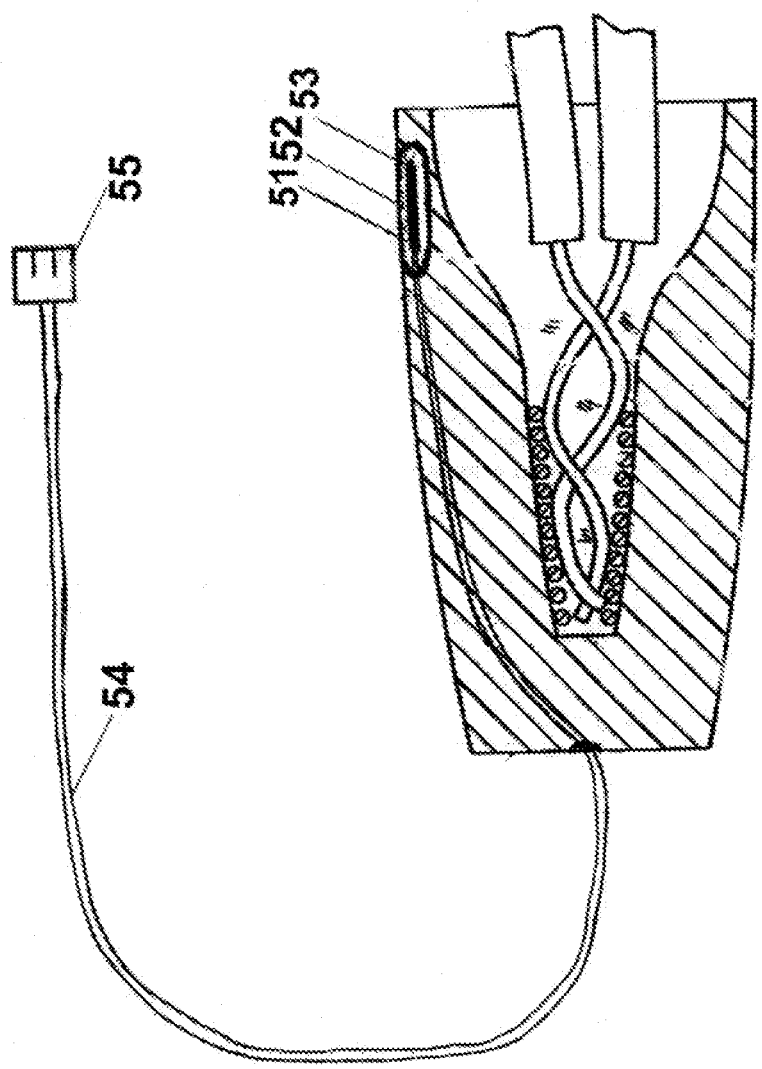

FIG. 5 is a cross-sectional view of a twist-on wire connector with a temperature sensor 51 embedded in a chamber 53 of the connector's housing in accordance with some embodiments. This chamber 53 can also contain a silicone paste 52 to improve thermal conductivity between the housing, spiral coil, and/or wires and the temperature sensor in some embodiments. Insulated sensor leads 54 can exit the housing through the top and terminate in 2-pin connector 55 in some embodiments.

Figure 6:
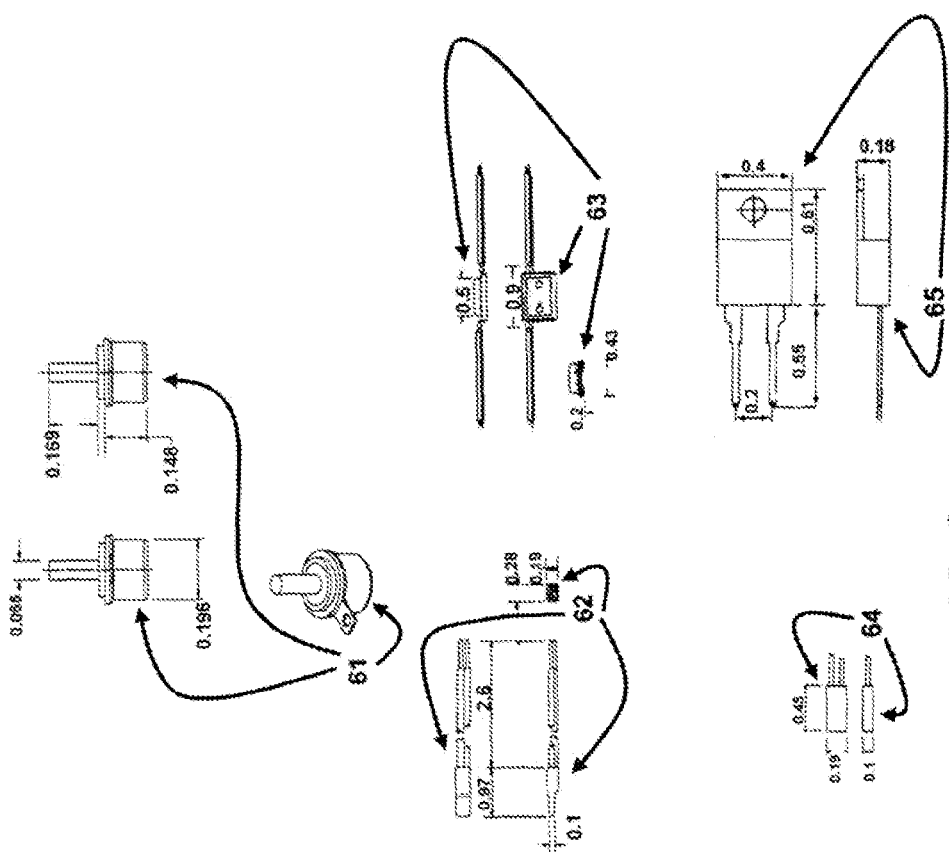
FIG. 6 shows examples of drawings of circuit interrupter devices in accordance with the prior art.

In some embodiments, additional temperature sensors and/or circuit interrupting devices can be incorporated into lighting fixture leads. These sensors and/or devices can provide redundancy and backup protection in some embodiments. For example, line-voltage, snap-action, self-resettable circuit interrupters such as those shown in FIG. 6 can be used in some embodiments. More particularly, a KLIXON 3BT thermostat 61, available from SENSATA TECHNOLOGIES, INC. of Attleboro, Mass., good for interrupting up to 1 Amp at 120V AC, a KLIXON MODEL 9700 motor protector 62, available from SENSATA TECHNOLOGIES, INC., good for up to 3 Amps at 250 VAC, a CD-79F THERMAL PROTECTOR 63 available from CALCO ELECTRIC CORP. of Canton, Ohio, good for 15 Amps at 120V AC, a TB02 thermal protector 64, available from CALCO ELECTRIC CORP., good for 3 Amps current at 120V AC, a JUC 31 disc thermostat 65, available from CALCO ELECTRIC CORP., good for 1 Amp at 250V AC, and/or any other suitable interrupter can be used in some embodiments.

Figure 7:
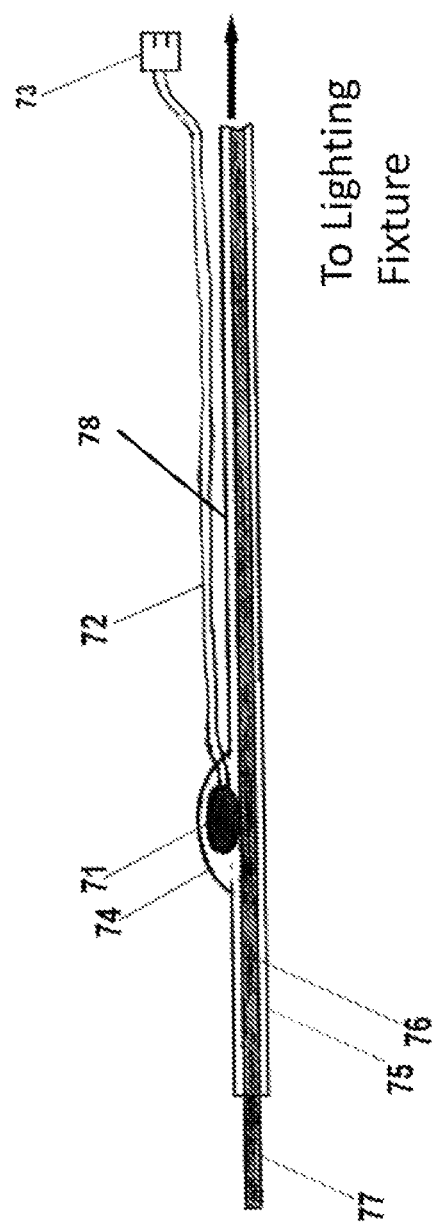
FIGS. 7-10 shows examples of lighting fixture wire leads with temperature sensors and circuit interrupting devices incorporated therein in accordance with some embodiments.

FIG. 7 shows portion of a lighting fixture wire lead 75 with a temperature sensor 71 incorporated under the wire insulation 74 without disturbing the strand(s) 76. Any suitable temperature sensor, such as a miniature thermistor or glass thermistor probe, can be used as temperature sensor 71 in some embodiments. Bare section 77 can be used to connect the lead to a ceiling outlet junction using a twist-on wire connector described above in connection with FIGS. 3-5. Leads 72 of temperature sensor 71 can terminate in a 2-pin connector 73 so that the sensor can be coupled to a controller board as described, for example, below in connection with FIGS. 11 and 12. In some embodiments, leads 72 can be positioned between strand(s) 76 and insulation 78, which may be integrated with, or separate from, insulation 74.

In some embodiments, the distance between bare section 77 and temperature sensor 71 may be less than 5.08 cm (2") to improve heat transfer from a junction including bare section 77 to the temperature sensor. In some embodiments, the distance between bare section 77 and temperature sensor 71 may be more than 2.54 cm (1") to lessen the likelihood of difficulties with attaching a twist-on wire connector to bare section 77.

Figure 8:
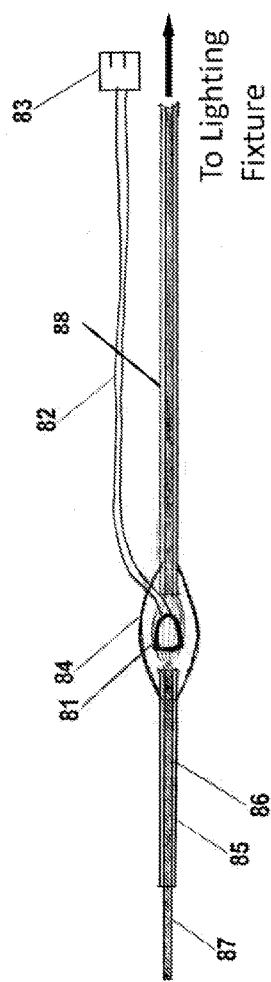

FIG. 8 shows portion of a lighting fixture wire lead 85 having a multi-strand wire with a temperature sensor 81 incorporated under its wire insulation 84. Any suitable temperature sensor, such as a miniature thermistor or glass thermistor probe, can be used as temperature sensor 81 in some embodiments. As illustrated, wire strands 86 of lead 85 may be slightly untwisted to accommodate the temperature sensor between the strands.

Bare section 87 can be used to connect the lead to a ceiling outlet junction using a twist-on wire connector described above in connection with FIGS. 3-5.

Leads 82 of temperature sensor 81 can terminate in a 2-pin connector 83 so that the sensor can be coupled to a controller board as described, for example, below in connection with FIGS. 11 and 12. In some embodiments, leads 82 can be positioned between strand(s) 86 and insulation 88, which may be integrated with, or separate from, insulation 84.

In some embodiments, the distance between bare section 87 and temperature sensor 81 may be less than 5.08 cm (2") to improve heat transfer from a junction including bare section 87 to the temperature sensor. In some embodiments, the distance between bare section 87 and temperature sensor 81 may be more than 2.54 cm (1") to lessen the likelihood of difficulties with attaching a twist-on wire connector to bare section 87.

Figure 9:
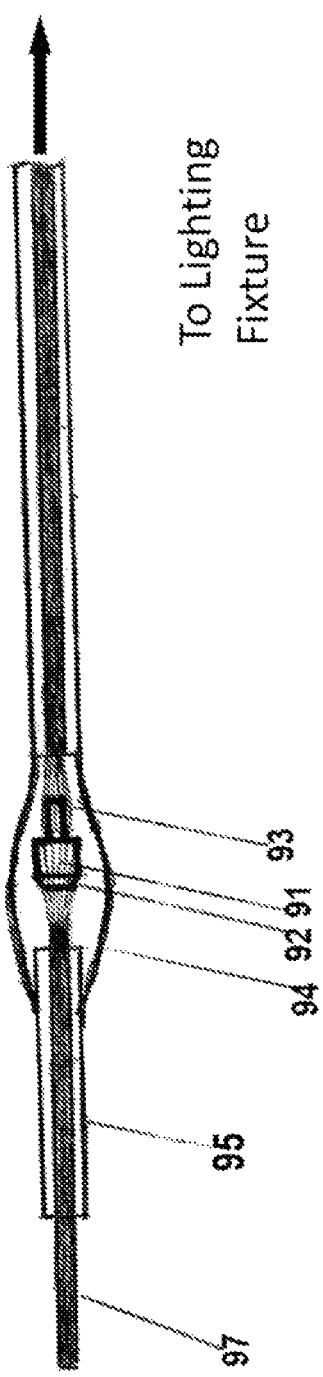

FIG. 9 shows an example of a lighting fixture wire lead 95 with a circuit interrupting device 91 connected in series. Any suitable circuit interrupting device, such as a KLIXON 3BT thermostat, can be used as circuit interrupting device 91 in some embodiments.

In order to manufacture such a lead 95 in accordance with some embodiments, lead 95 can be cut, wire insulation can be removed from the two portions of lead 95 adjacent to the point of the cut, first wire strands from the portion of the lead proximal to a bare end 97 can be spread around the body of the circuit interrupting device (in the case in which the body is a terminal of the device) to improve heat transfer, the first wire strands can be soldered (or otherwise coupled) to a terminal 92 of device 91, second wire strands from the portion of the lead distal to bare end 97 can be soldered (or otherwise coupled) to a terminal 93 of device 91, and heat shrink type insulation 94 can be applied over the temperature sensor, first wire strands, and second wire strands.

If temperature on the first strands exceeds a given threshold as a result of, for example, of arcing and/or resistance at bare end 97 of lead 95, the circuit interrupting device may then interrupt the current through the wire lead. In some embodiments, this may cut power to a lighting fixture, which may then indicate the loss of power via any suitable mechanism, such as an audible or visual alert. In some embodiments, the threshold may be set at a temperature higher than that associated with a temperature sensor implanted in a twist-on wire connector so that the circuit interrupter device can provide back-up protection for the temperature sensor.

In some embodiments, the distance between bare section 97 and circuit interrupter device 91 may be less than 5.08 cm (2") to improve heat transfer from a junction including bare section B97 to the temperature sensor. In some embodiments, the distance between bare section 97 and the circuit interrupter device may be more than 2.54 cm (1") to lessen the likelihood of difficulties with attaching a twist-on wire connector to bare section 97.

Figure 10:
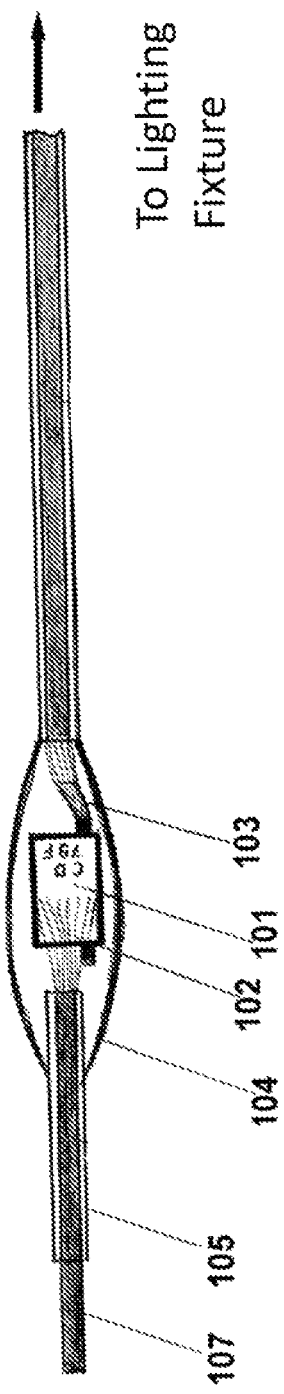

FIG. 10 shows another example of a lighting fixture wire lead 105 with a circuit interrupting device 101 connected in series. Any suitable circuit interrupting device, such as a CD-79F THERMAL PROTECTOR, can be used as circuit interrupting device 101 in some embodiments.

In order to manufacture such a lead 105 in accordance with some embodiments, lead 105 can be cut, wire insulation can be removed from the two portions of lead 105 adjacent to the point of the cut, first wire strands from the portion of the lead proximal to a bare end 107 can be spread around the body of the circuit interrupting device (in the case in which the body is a terminal of the device) to improve heat transfer, the first wire strands can be soldered (or otherwise coupled) to a terminal 102 of device 101, second wire strands from the portion of the lead distal to bare end 107 can be soldered (or otherwise coupled) to a terminal 103 of device 101, and heat shrink type insulation 104 can be applied over the temperature sensor, first wire strands, and second wire strands.

If temperature on the first strands exceeds a given threshold as a result of, for example, of a glowing junction at bare end 107 of lead 105, the circuit interrupting device may then interrupt the current through the wire lead. In some embodiments, this may cut power to a lighting fixture, which may then indicate the loss of power via any suitable mechanism, such as an audible or visual alert. In some embodiments, the threshold may be set at a temperature higher than that associated with a temperature sensor implanted in a twist-on wire connector so that the circuit interrupter device can provide back-up protection for the temperature sensor.

In some embodiments, the distance between bare section 107 and circuit interrupter device 101 may be less than 5.08 cm (2") to improve heat transfer from a junction including bare section 107 to the temperature sensor. In some embodiments, the distance between bare section 107 and the circuit interrupter device may be more than 2.54 cm (1") to lessen the likelihood of difficulties with attaching a twist-on wire connector to bare section 107.

Figure 11:
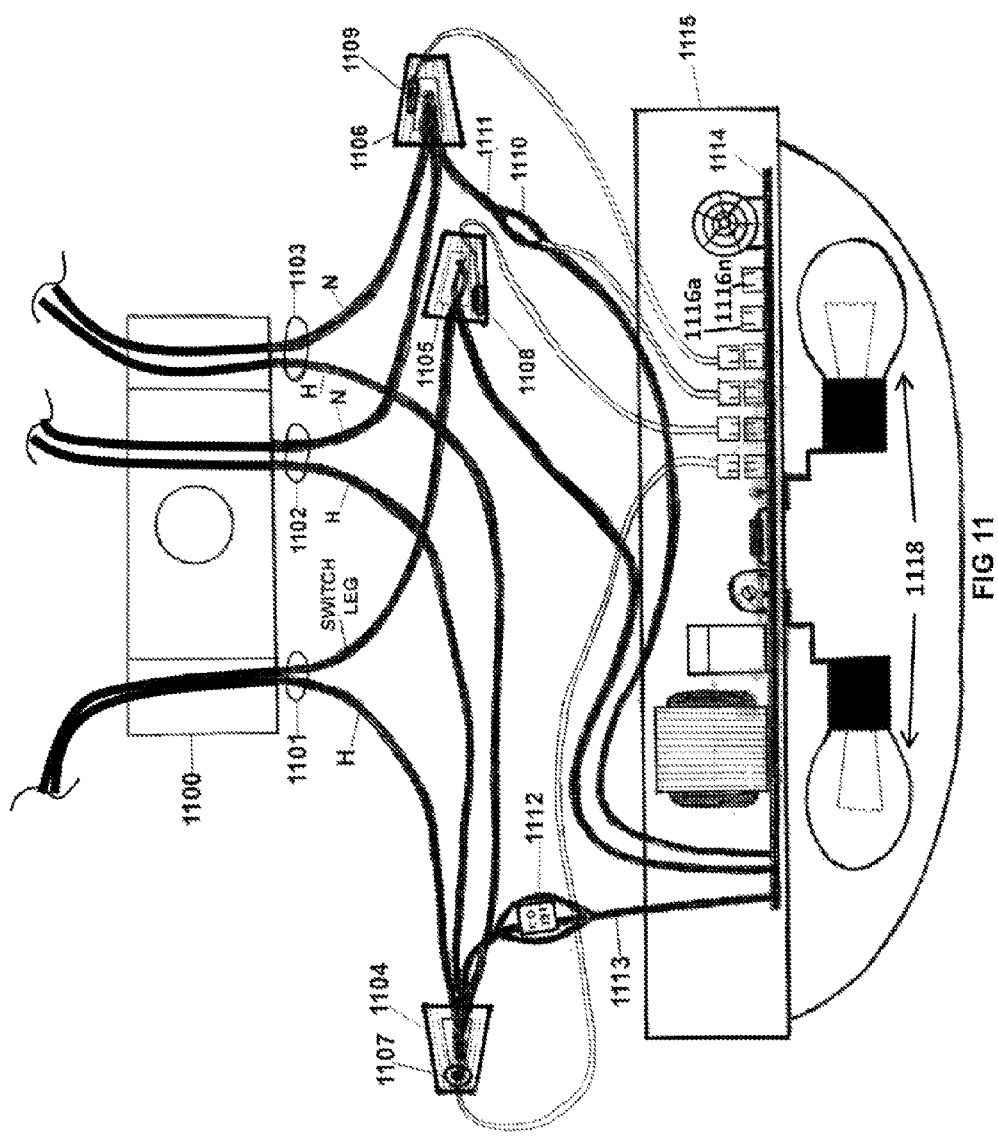
FIGS. 11 and 12 illustrate lighting fixture connections to cables at a junction box in accordance with some embodiments.

FIG. 11 shows an example of a lighting fixture 1115 connected to cables from a junction box 1100 in accordance with some embodiments.

As illustrated, a ceiling outlet junction box 1100 can house three two-wire cables 1101, 1102, and 1103. Cable 1101 can be a cable that is connected to two poles of a switch. Cable 1102 can be a cable that is connected to a source of un-switched power, such as a line from a circuit breaker panel. Cable 1103 can be a cable that provides power to other components. Although three two-wire cables are illustrated in FIG. 11, any suitable number of cables and any suitable types of cables can be used in some embodiments. Although three twist-on type junctions are illustrated in FIG. 11, any suitable number of junctions and any suitable types of junctions can be used in some embodiments.

As can be seen, there are three wire junctions in junction box 1100 that are formed using twist-on connectors 1104, 1105 and 1106. Each one of these connectors can contain one or more temperature sensors placed in any suitable area(s) of the wire connector housings. For example, sensor 1107 can be placed at the tip of connector 1104 adjacent to its spiral metal coil, sensor 1108 can be placed in the plastic housing body of connector 1105, and sensor 1109 can, be placed in the middle of the housing of connector 1106 in close proximity to its spiral coil. As shown, for example, a temperature sensor 1110 can additionally or alternatively be embedded in a lighting fixture neutral wire lead 1111 in some embodiments. A circuit interrupter device 1112 can additionally or alternatively be embedded in an un-switched power lead 1113.

In some embodiments, a control circuit 1114 can be located in lighting fixture housing 1115. Control circuit 1114 can detect temperature conditions in lighting fixture 1115 and/or junction box 1100 and take any suitable action. For example, circuit 1114 can cut power to light bulbs 1118, generate an audible or visual alarm, and/or perform any other suitable function.

Circuit 1114 can be coupled to leads from the temperature sensors in twist-on wire connectors 1104, 1105, and 1106. Any suitable number, and any suitable type, of temperature sensors can be coupled to circuit 1114 in some embodiments. Extra connectors 1116a to 1116n can also be provided to circuit 1114 to accommodate any additional temperature sensors that may be desired or needed in an application in some embodiments.

Figure 12:
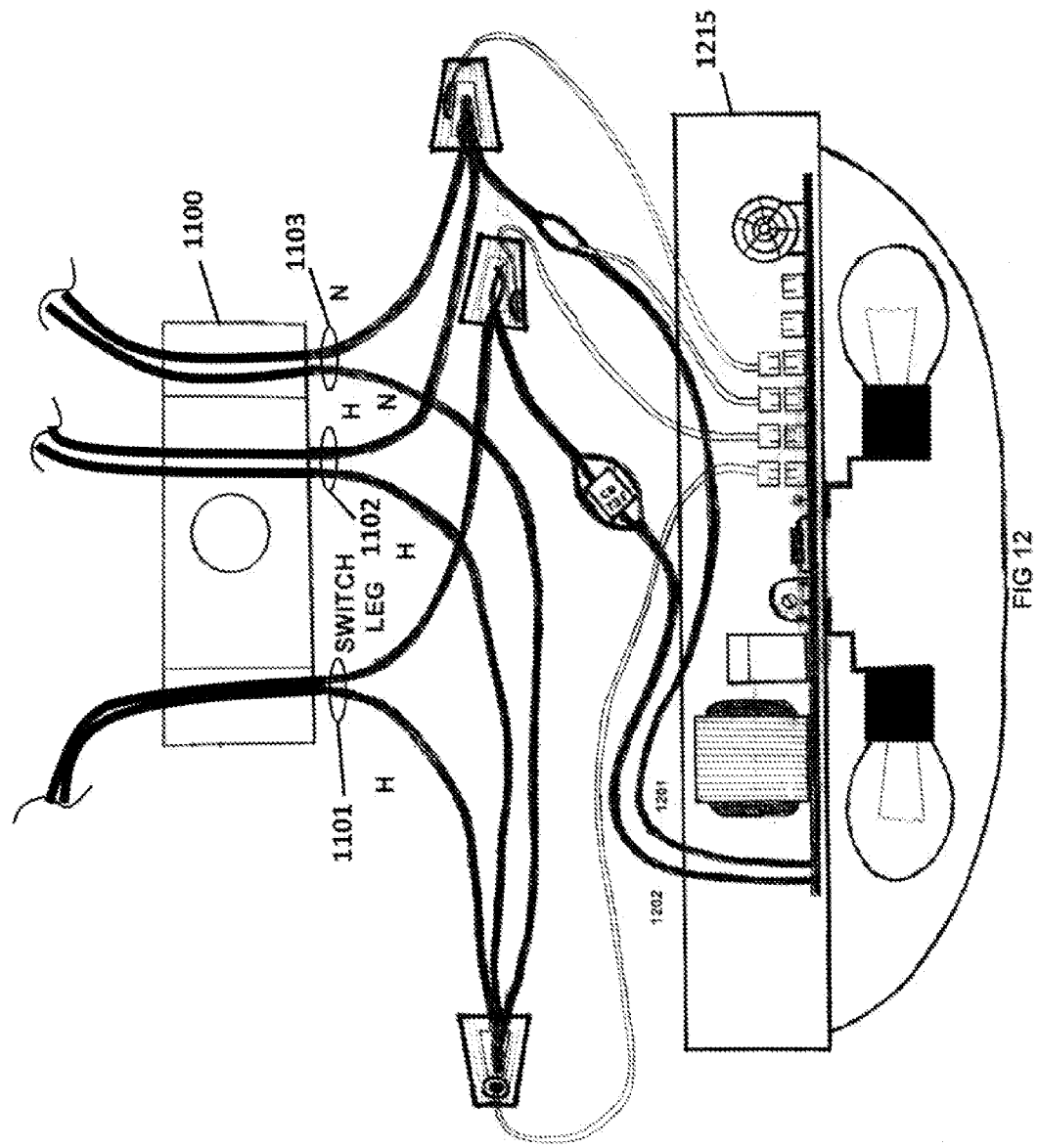

FIG. 12 shows another example of a lighting fixture 1215 connected to cables 1101, 1102, and 1103 from a junction box 1100 in accordance with some embodiments. As shown, two power wires 1201 and 1202 are provided to fixture 1215 instead of three wires as shown connected to fixture 1115 of FIG. 11. This may be the case when only switched voltage is available at junction box 1100.

Figure 13:
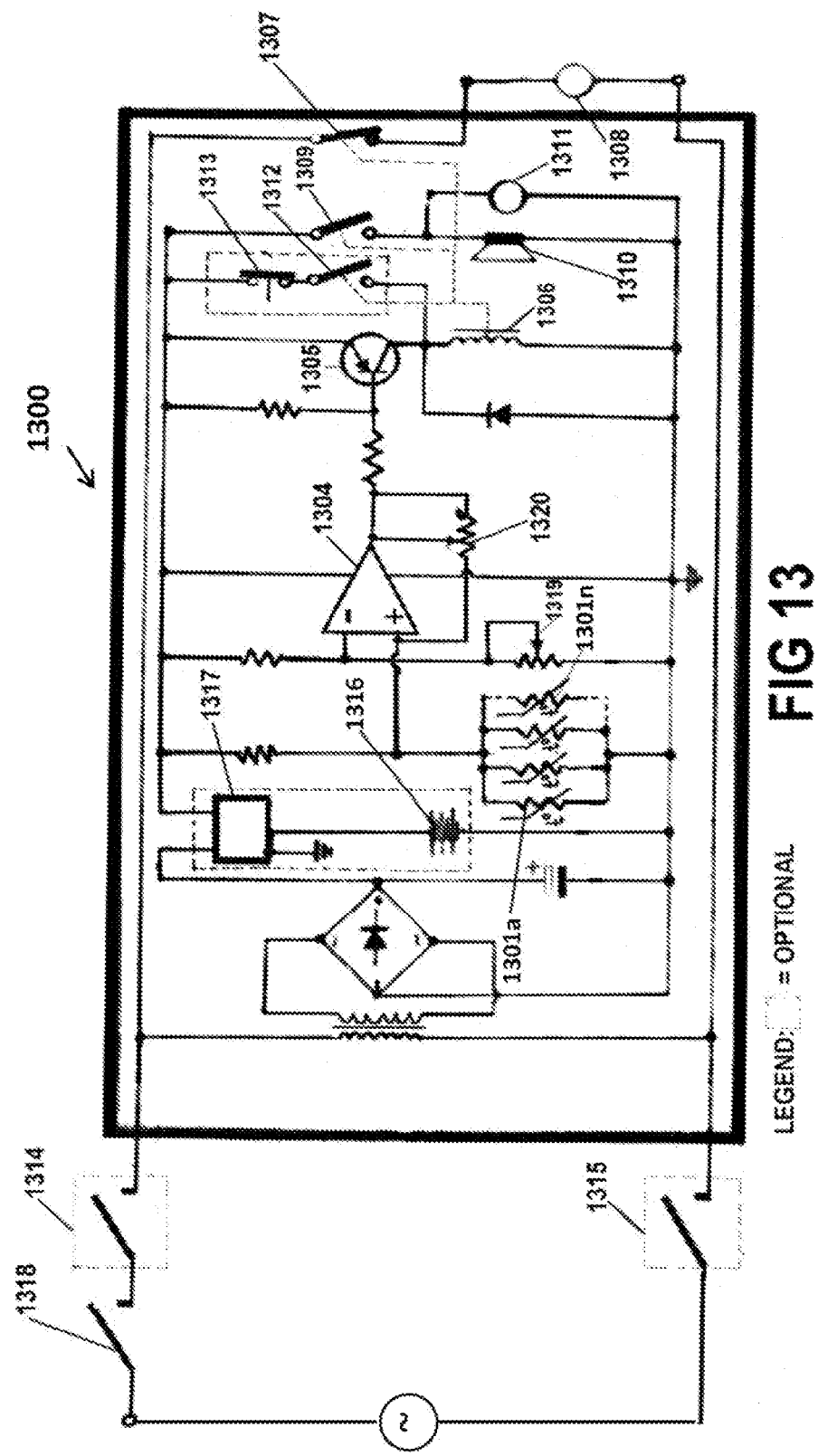
FIGS. 13-15 are schematic diagrams of control circuits that can be used to detect temperature conditions and perform actions in response thereto in accordance with some embodiments.

FIG. 13 illustrates an example of a schematic diagram of a control circuit 1300 that can be used to detect temperature conditions and perform an action in response thereto in accordance with some embodiments. Circuit 1300 can be used as circuit 1114 in some embodiments.

Circuit 1300 may be provided with switched power from a power source and a light switch 1318.

As shown, circuit 1300 may include thermistors 1301a to 1301n as temperature sensors in some embodiments. Any suitable number, including only one, of thermistors can be used in some embodiments. Any suitable type or types of thermistor(s), such as Negative Temperature Coefficient) thermistors, can be used in some embodiments.

These thermistors can be used as temperature sensors and positioned in a lighting fixture and/or junction box as described herein. For example, these thermistors can be placed in lighting fixture junction twist-on connectors as shown on FIGS. 3-5 or in lighting fixture wire leads using one of the methods shown in FIGS. 7-8.

Thermistors 1301a-1301n may be connected in parallel, and have one side connected to ground and another side connected to a non-inverting input of an operational amplifier 1304. Any suitable operation amplifier, such as a LM741 operational amplifier available from NATIONAL SEMICONDUCTOR CORPORATION, can be used in some embodiments.

In operation, as the resistance of the parallel thermistors drops under a given level due to increased temperature at one or more of the thermistors, the operational amplifier drives a transistor 1305, which drives a relay winding 1306 of a relay. In response to the winding being driven, a normally closed switch 1307 of the relay opens and thereby disconnects power to one or more light bulbs 1308 of the lighting fixture. A normally open switch 1309 of the relay may also close in response to the winding being driven and thereby activate an audible alarm 1310 and/or a visual alarm 1311. Another normally open switch 1312 of the relay may also be provided and wired in parallel to transistor 1305 to latch the relay winding in the energized state once the relay winding is energized. In this way, power can remain disconnected from the one or more light bulbs 1308 of the lighting fixture even after the temperature at the thermistors has dropped (e.g., due to the junction cooling off). A normally closed momentary switch 1313 can be provided in series with switch 1312 to allow an operator to release the latched state of the relay winding and thereby restore power to the light bulbs 1308.

In some embodiments, temperature sensitive circuit interrupter devices 1314 and 1315 can be included in circuit 1300. Any suitable type(s) and number of circuit interrupter devices can be used, and these devices can be installed in any suitable location (e.g., such as in lighting fixture lead wires as shown in FIGS. 9-10). An activation of any one of devices 1314 and/or 1315 may cause an interruption of a line voltage supply to circuit 1300. In some embodiments, the circuit interrupter devices can be selected and/or configured to disconnect power at a temperature that is higher than the temperature at which relay winding 1306 is energized so that devices 1314 and 1315 act as back-up temperature sensors.

In some embodiments, a battery 1316 and/or a battery charging circuit 1317 can be provided. Any suitable battery 1316 and battery charging circuit 1317 can be used in some embodiments. When line power is available to circuit 1300, battery charging circuit 1317 can regulate the voltage from a rectifier, provide a DC supply voltage, and charge battery 1316. When line power is not available, circuit 1317 can provide power from battery 1316 as the DC supply voltage.

A potentiometer 1319 can also be provided in circuit 1300 as part of a voltage divider that sets the reference voltage at the inverting input of operational amplifier 1304 in some embodiments. This reference voltage can be used to adjust the temperature point at which relay winding 1306 is energized. In some embodiments, a potentiometer 1320 can be provided and used to set a hysteresis between the temperature at which the relay winding is driven by transistor 1305 and the temperature at which the transistor no longer drives the relay winding (although, the winding may still be driven by switches 1312 and 1313).

Figure 14:
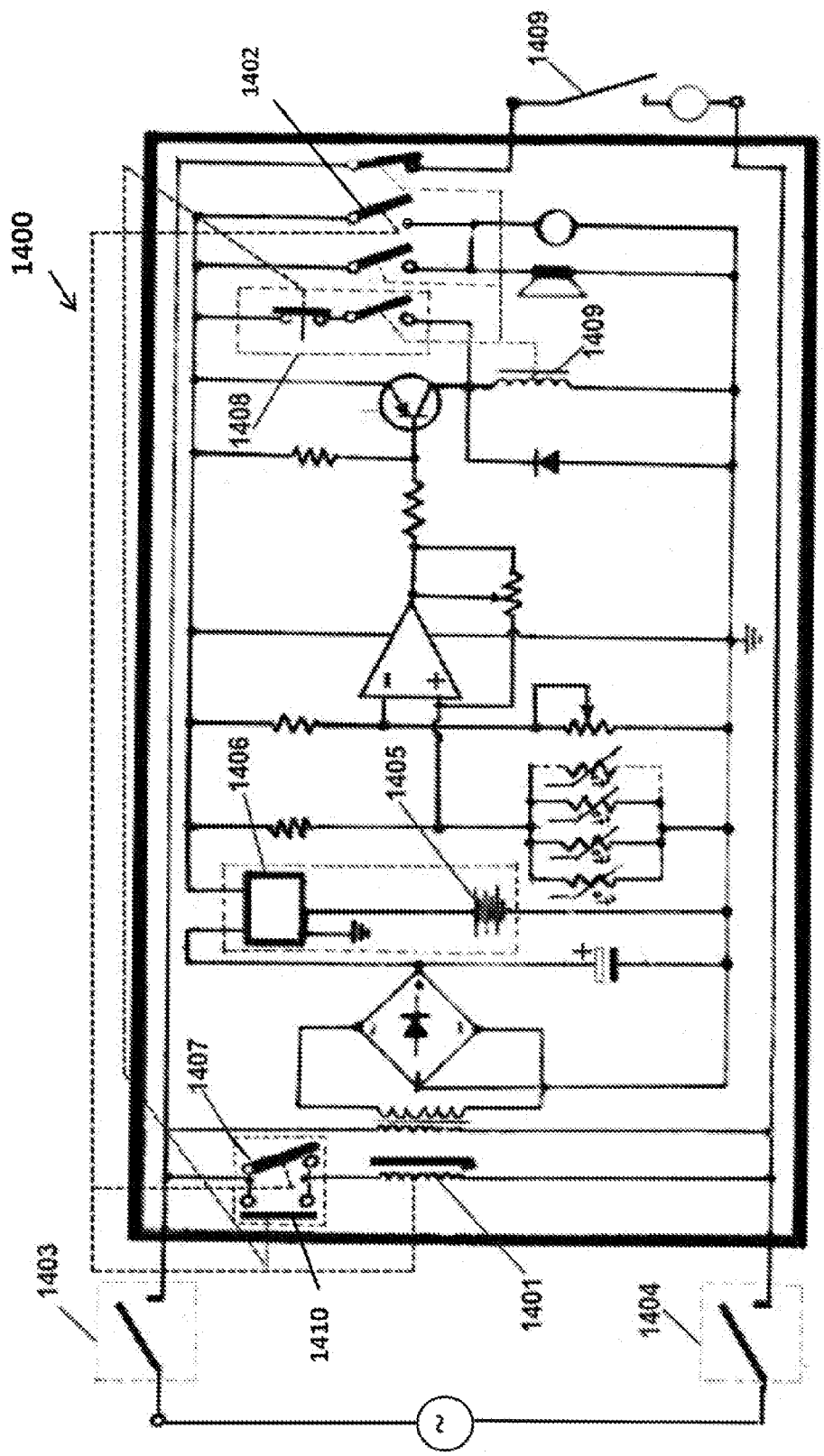

FIG. 14 illustrates an example of a schematic diagram of a control circuit 1400 that can be used to detect temperature conditions and perform an action in response thereto in accordance with some embodiments. Circuit 1400 can be used as circuit 1114 in some embodiments.

Circuit 1400 may be provided with un-switched power from a power source and used in instances in which no wall light switch is used and, instead, a light switch 1409 is provided on the lighting fixture (e.g., a "pull chain" type switch).

As shown, circuit 1400 may include a relay having a relay winding 1401, a normally closed switch 1402, and a normally open switch 1407. When power is received at circuit 1400 via circuit interrupting devices 1403 and 1404 and a momentary switch 1410 is manually closed, relay winding 1401 is energized which causes switch 1402 to open. However, when power to the relay winding is removed, such as because one of devices 1403 and/or 1404 has opened due to an over-temperature condition, switch 1402 closes causing an alarm to be generated.

Figure 15:
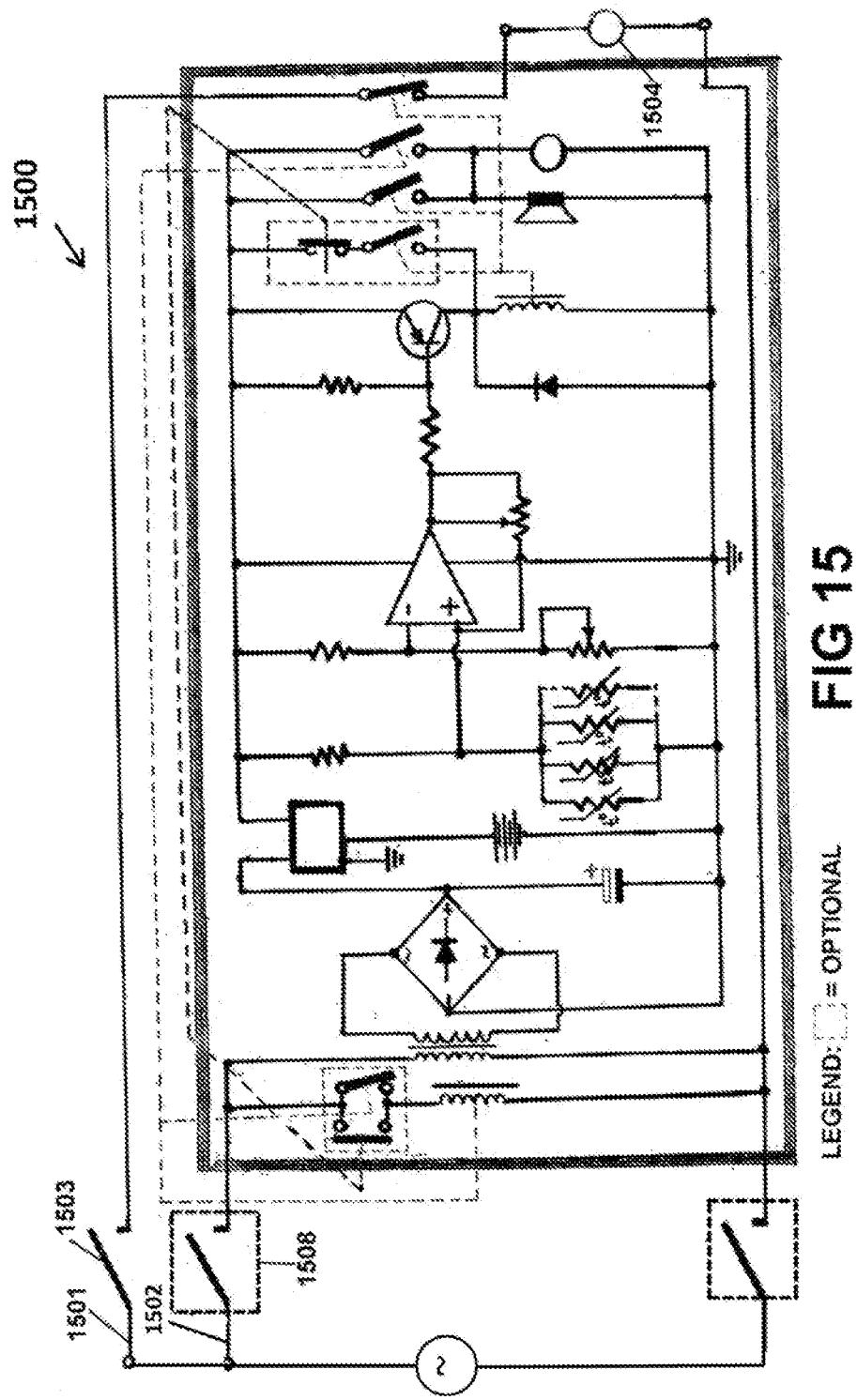

FIG. 15 illustrates an example of a schematic diagram of a control circuit 1500 that can be used to detect temperature conditions and perform an action in response thereto in accordance with some embodiments. Circuit 1500 can be used as circuit 1114 in some embodiments.

Circuit 1500 may be provided when both switched power and un-switched power are available via lines 1501 and 1502, respectively. As shown, a wall mounted light switch 1503 can be used to interrupt the circuit of light bulbs 1504.

Although the invention has been described and illustrated in the foregoing illustrative embodiments, it is understood that the present disclosure has been made only by way of example, and that numerous changes in the details of implementation of the invention can be made without departing from the spirit and scope of the invention, which is only limited by the claims which follow. Features of the disclosed embodiments can be combined and rearranged in various ways.

What is claimed is:

1. A system for protecting from overheating a physical electrical wire connection formed from a plurality of electrical wires that are part of an electrical circuit inside a ceiling light fixture, comprising:
    a ceiling light fixture housing configured to be attached to a ceiling-mounted junction box that contains:
        a twist-on wire connector configured to maintain the physical electrical wire connection, wherein the twist-on wire connector connects a conductor of a wire of the light fixture to a building power conductor, wherein the conductor supplies power to the light fixture, and wherein the wire of the light fixture is formed from the conductor and insulation;
        a temperature sensor that is separate from the twist-on wire connector, that is configured to detect the temperature of the conductor, and that produces a first signal in response to a temperature of the conductor;
        an operational amplifier coupled to the temperature sensor that produces at a first output a second signal having a first value when the temperature exceeds a temperature value and a second value when the temperature is less than the temperature value; and
        a relay having a control input coupled to the second signal and having a switch coupled to the electrical circuit that opens the electrical circuit in response to the second signal having the first value.

2. The system of claim 1, wherein the switch is configured to keep the electrical circuit open after the second signal changes from the first value to the second value.

3. The system of claim 1, further comprising an audible alarm coupled to the first output.

4. The system of claim 1, further comprising a visible alarm coupled to the first output.

5. The system of claim 1, wherein the electrical circuit includes a light bulb.

* * * * *